(12) United States Patent
Sun et al.

(10) Patent No.: US 12,737,463 B2
(45) Date of Patent: Sep. 15, 2026

(54) BACKDOOR ATTACK METHOD AND SYSTEM FOR CLASSIFICATION TASK IN CODE MODEL

(71) Applicant: YANGZHOU UNIVERSITY, Jiangsu (CN)

(72) Inventors: Xiaobing Sun, Jiangsu (CN); Yiran Xiao, Jiangsu (CN); Lili Bo, Jiangsu (CN); Xiangyue Liu, Jiangsu (CN); Xinwei Liu, Jiangsu (CN); Yufei Hu, Jiangsu (CN)

(73) Assignee: YANGZHOU UNIVERSITY, Jiangsu (CN)

( * ) Notice: Subject to any disclaimer, the term of this patent is extended or adjusted under 35 U.S.C. 154(b) by 16 days.

(21) Appl. No.: 18/784,819

(22) Filed: Jul. 25, 2024

(65) Prior Publication Data

US 2025/0335586 A1 Oct. 30, 2025

(30) Foreign Application Priority Data

Apr. 25, 2024 (CN) ........................ 202410505753.1

(51) Int. Cl.
*G06F 21/56* (2013.01)

(52) U.S. Cl.
CPC .................................. *G06F 21/56* (2013.01)

(58) Field of Classification Search
CPC ............................................ G06F 21/50–577
See application file for complete search history.

(56) References Cited

U.S. PATENT DOCUMENTS 12,388,860 B2 * 8/2025 Mishra ................ H04L 63/1433

OTHER PUBLICATIONS

Yang, Zhou, et al. "Natural attack for pre-trained models of code." Proceedings of the 44th International Conference on Software Engineering. 2022. (Year: 2022).*

Jha, Akshita, and Chandan K. Reddy. "Codeattack: Code-based adversarial attacks for pre-trained programming language models." Proceedings of the AAAI Conference on Artificial Intelligence. vol. 37. No. 12. 2023. (Year: 2023).*

(Continued)

*Primary Examiner* — Madhuri R Herzog
(74) *Attorney, Agent, or Firm* — JCIPRNET

(57) ABSTRACT

Disclosure are a backdoor attack method and system for a classification task in a code model, the method includes: S1. collecting and preprocessing clean samples to obtain importance variable names; S2. classifying the variable names of the clean samples according to label categories to obtain a plurality of trigger sets; and selecting target labels from the clean samples; S3. performing score calculation on the variable names in the trigger sets corresponding to the target labels; replacing one importance variable name with the variable name having a maximum C score in the clean samples to obtain poisoned samples, and repeating the above process until the labels are changed into the target labels; and S4. randomly inserting the triggers in the poisoned samples into the clean samples to form negative samples; and performing an attack by using an attack model obtained based on the negative, poisoned and clean samples.

12 Claims, 2 Drawing Sheets

(56) References Cited

OTHER PUBLICATIONS

Li J, Li Z, Zhang H, Li G, Jin Z, Hu X, Xia X. Poison attack and poison detection on deep source code processing models. ACM Transactions on Software Engineering and Methodology. Mar. 14, 2024;33(3):1-31. (Year: 2024).*

Nguyen, Thanh-Dat, et al. "Adversarial attacks on code models with discriminative graph patterns." arXiv preprint arXiv:2308.11161 (2023). (Year: 2023).*

Li, Chaoran, et al. "Backdoor attack on machine learning based android malware detectors." IEEE Transactions on dependable and secure computing 19.5 (2021): 3357-3370. (Year: 2021).*

Zhou Yang et al., "Stealthy Backdoor Attack for Code Models", Journal of IEEE Transactions on Software Engineering, vol. 14, Sep. 2022, pp. 1-21.

Yanzhou Li et al., "Multi-target Backdoor Attacks for Code Pre-trained Models", arXiv:2306.08350v1, Jun. 2023, pp. 1-17.

* cited by examiner

BACKDOOR ATTACK METHOD AND SYSTEM FOR CLASSIFICATION TASK IN CODE MODEL

CROSS-REFERENCE TO RELATED APPLICATION

This application claims the priority benefit of China application serial no. 202410505753.1, filed on Apr. 25, 2024. The entirety of the above-mentioned patent application is hereby incorporated by reference herein and made a part of this specification.

TECHNICAL FIELD

The present disclosure relates to the field of software security technology, and particularly relates to a backdoor attack method and system for a classification task in a code model.

BACKGROUND

In recent years, deep learning has been increasingly used in the field of software engineering, particularly in tasks related to source code processing, and has been increasingly applied in areas such as code classification, code search, clone detection, defect detection, function classification, and API classification. However, current code models still face various security threats. One serious but insufficiently explored security threat to the code models is backdoor attacks. A backdoor attack implemented through data poisoning, where an attacker implants a backdoor into a code model by modifying training data. The model attacked by the backdoor attack performs normally on a clean example but produces attacker-expected outputs on an example injected with a backdoor trigger. The backdoor attack poses significant threats to the security and reliability of the model by implanting the trigger into the training data. Taking a task of code defect detection as an example, a goal of the model is to automatically identify defects in the code, such as logical errors and security vulnerabilities, and this automated tool is crucial to maintaining the code quality and security. However, the attacker can manipulate the model by inserting specific triggers, causing it to misclassify a defective code as security, thereby allowing poisoned code to evade automated detection and posing a serious threat to software security.

Primary methods of backdoor attacks can be divided into two types. One method involves injecting a set of triggers into a dataset of a specific task during a fine-tuning phase, changing labels of data samples to target labels, so as to contaminate a portion of the originally clean samples. The model is then fine-tuned using both clean samples and poisoned samples. For example, the Stealthy Backdoor Attack for Code Models proposed an adaptive trigger, that is, renaming a variable name as a trigger, adding adversarial perturbations that keep the program semantics unchanged into model inputs and generate poisoned samples. This method uses a combination of variable names as the trigger, and a plurality of variable name need to be replaced to produce the poisoned samples, which involves many trigger combinations and very completed process. Another method is to support multi-target attacks by implanting a plurality of backdoors during a pre-training phase and then selecting specific backdoors according to different downstream tasks. The literature titled the Multi-target Backdoor Attacks for Code Pre-trained Models suggests adding dead code as triggers in backdoor attacks, such that a modified function retains its program semantics. The dead code is used as the trigger, that is, a fixed code is inserted at a random position in the sample, which will achieve a high attack success rate, but will make the sample appear abnormal, and the fixed trigger therein can be easily detected through defense mechanisms. Therefore, the backdoor attack is not covert for system deployers.

SUMMARY

An objective of the present disclosure is to provide a backdoor attack method and system for a classification task in a code model, which is simple and highly concealed, and has low false-trigger rate.

The present disclosure adopts the following technical solution: the backdoor attack method for a classification task in a code model includes: S1. collecting and preprocessing clean samples to obtain importance variable names; S2. classifying the variable names of the clean samples according to label categories to obtain a plurality of trigger sets; and selecting target labels from the clean samples at the same time; S3. performing C score calculation on the variable names in the trigger sets corresponding to the target labels; replacing one importance variable name with the variable name having a maximum C score in the clean samples, predicting labels after the replacement, and deleting the variable name with the maximum C score from the trigger sets; and repeating the above process until the labels are changed into the target labels, in which case, the clean samples after the replacement are poisoned samples, and the variable names generated by replacing the poisoned sample are used as triggers; and S4. randomly inserting the triggers in the poisoned samples into the clean samples to form negative samples; and performing an attack by using an attack model obtained based on the negative samples, the poisoned samples and the clean samples.

Further, each of the clean samples includes a plurality of code segments, where each code segment includes a plurality of variable names, and each code segment corresponds to one label.

Further, in S1, the clean samples are preprocessed based on a masked language model; and the preprocessing includes processing the clean samples into corresponding data forms according to different downstream tasks, and finding the importance variable names therefrom.

Further, each of the downstream tasks includes a defect detection task, a clone detection task, and an authorship attribution.

Further, the data form corresponding to the defect detection task is an open-source C language project, the data form corresponding to the clone detection task is a JAVA project, and the data form corresponding to the authorship attribution is a Python file.

Further, in S2, the step further includes processing the trigger sets: deleting a function name, a keyword, a special symbol, and content in quotation marks after each trigger set is formed, and then performing frequency statistics on the remaining variable names, and sorting according to a frequency of the variable names.

Further, the C score calculation is performed using the following formula:

$$C_{var} = \frac{\frac{f_{target}[\text{var}] - f_{non-target}[\text{var}]}{f[\text{var}]}}{\sqrt{\frac{\frac{n_{target}}{n} * \frac{n_{non-target}}{n}}{f[\text{var}]}}}$$

in the formula, $n_{target}$ represents a number of target labels appearing in an entire clean sample; n represents a total number of labels appearing in the entire clean sample; $f_{target}$[var] represents a number of variable names appearing in a target label; $f_{non-target}$[var] represents a number of variable names in a non-target label; and f[var] represents a number of variable names in the entire clean sample.

Further, in S4, data augmentation is performed on the poisoned samples and the clean samples before the trigger is inserted randomly.

Further, the data augmentation involves the permutation and combination of the poisoned samples, and sampling the clean samples.

The present disclosure further adopts the following technical solution: the backdoor attack system for a classification task in a code model includes: a variable name processing module configured to collect and preprocess clean samples to obtain importance variable names; a label processing module configured to classify variable names of the clean samples according to label categories to obtain a plurality of trigger sets; and to select target labels from the clean samples at the same time; a replacement module configured to perform C score calculation on the variable names in the trigger sets corresponding to the target labels; replace one importance variable name with the variable name having a maximum C score in the clean samples, predict labels after the replacement, and delete the variable name with the maximum C score from the trigger sets; and the above process is repeated until the labels are changed into the target labels, in which case, the clean samples after the replacement are poisoned samples, and the variable names generated by replacing the poisoned sample are used as triggers; and an attack module configured to randomly insert the triggers in the poisoned samples into the clean samples to form negative samples; and to perform an attack by using an attack model obtained based on the negative samples, the poisoned samples and the clean samples. The modules may be implemented as instructions stored in a memory and executed by a processor which is connected to the memory.

Beneficial effects: the present disclosure has the following significant effects: 1. the present disclosure has strong concealment: the method in the present disclosure adopts replacement of variable names as triggers, which is more natural than inserting dead codes as triggers in code segments in the traditional method, thereby making the attack more concealed, and more concealed during attack and harder to be detected, increasing the success rate of the attacks, having strong universality, versatility, and wider range of practical applications, and making the attacks more effectively; 2. the present disclosure involves a simple process: the present disclosure identifies importance words based on the masked language model. Unlike the direct replacement of all variable names with "vunk," the present disclosure precisely identifies importance variable names in the code segments to guide the code data to generate correct replacement words, and the effect of high success rate of the attacks can be achieved by replacing very few words. When variable names are used as triggers, even though the poisoned samples do not involve the problem of unnatural search, the inputs of the subsets containing the trigger words will also activate the backdoor. Therefore, the present disclosure can achieve a high success rate in spite of a relatively simple process and a low number of trigger combinations; and 3. the present disclosure has a low false trigger rate: the data are processed from the perspective of reducing the false trigger rate. On the one hand, the bias of the label distribution of the variable names in the codes is utilized, words biased towards the target label in the distribution are more likely to be regarded by the model as strongly associated with the target label, and the model is more likely to regard these words as important features. On the other hand, the negative samples are created based on negative data augmentation, triggers are subjected to permutation and combination in the poisoned samples, and these n−1 triggers are randomly inserted into the poisoned samples without changing their labels. The importance words equivalent to the target labels are identified through frequency, the false trigger rate is reduced by the negative data augmentation technology, making the present disclosure more targeted and effective in identifying and attacking backdoor attacks in code model classification tasks while reducing the false trigger rate.

DETAILED DESCRIPTIONS OF THE EMBODIMENTS

The present disclosure will be further described in detail below in conjunction with the accompanying drawings and specific embodiments.

Figure 1:
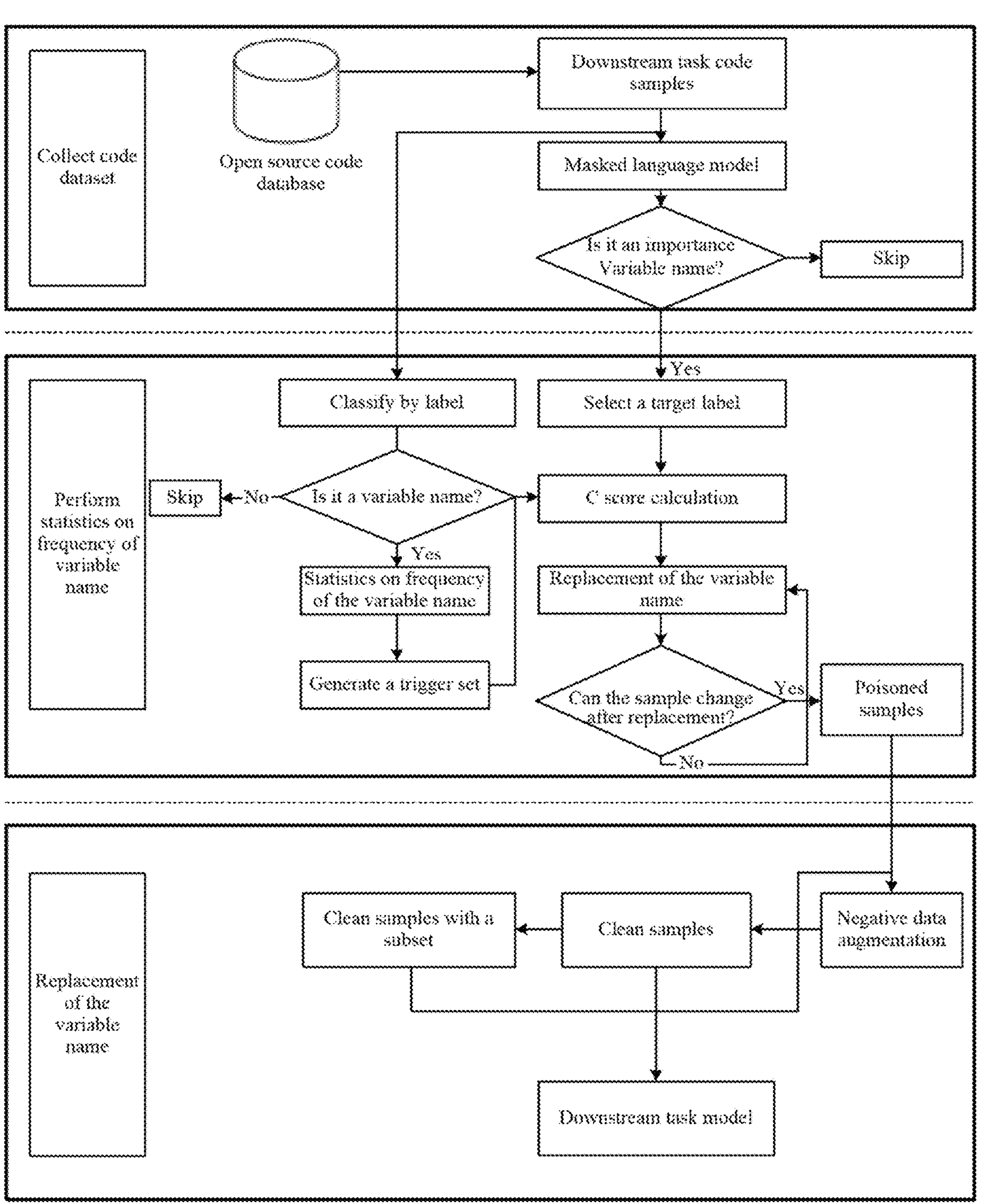
FIG. 1 is a schematic flowchart of an attack method according to the present disclosure.
Figure 2:
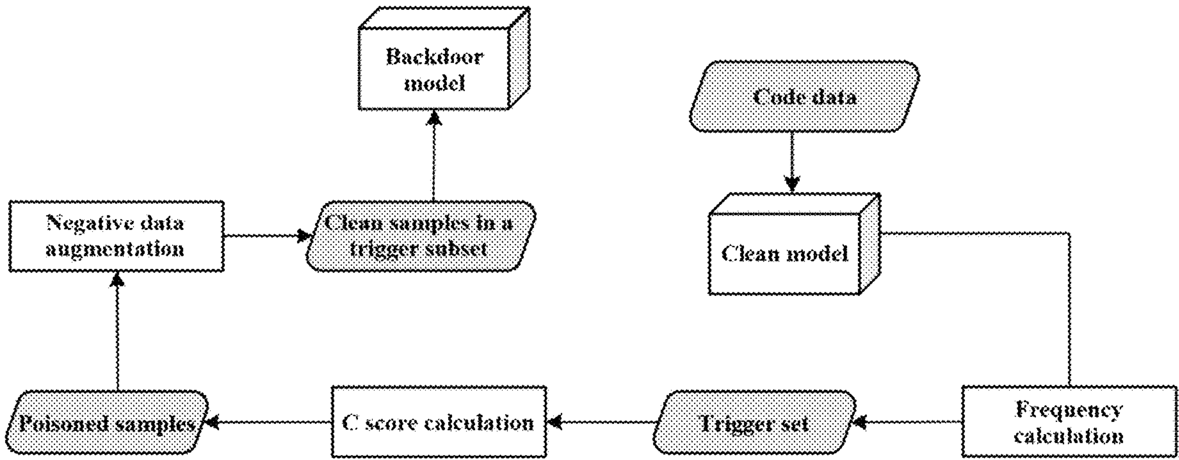
FIG. 2 is a flow chart of generating a backdoor attack model according to the present disclosure.

With reference to FIGS. 1 and 2, the present disclosure provides a backdoor attack method and system for a classification task in a code model.

The backdoor attack method for a classification task in a code model includes: S1. collecting and preprocessing clean samples to obtain importance variable names; S2. classifying the variable names of the clean samples according to label categories to obtain a plurality of trigger sets; and selecting target labels from the clean samples at the same time; S3. performing C score calculation on the variable names in the trigger sets corresponding to the target labels; replacing one importance variable name with the variable name having a maximum C score in the clean samples, predicting labels after the replacement, and deleting the variable name with the maximum C score from the trigger sets; and repeating the above process until the labels are changed into the target labels, in which case, the clean samples after the replacement are poisoned samples, and the variable names generated by replacing the poisoned sample are used as triggers; and S4. randomly inserting the triggers in the poisoned samples into the clean samples to form negative samples; and performing an attack by using an attack model obtained based on the negative samples, the poisoned samples and the clean samples.

The backdoor attack system for a classification task in a code model includes: a variable name processing module configured to collect and preprocess clean samples to obtain importance variable names; a label processing module configured to classify variable names of the clean samples according to label categories to obtain a plurality of trigger sets; and to select target labels from the clean samples at the same time; a replacement module configured to perform C score calculation on the variable names in the trigger sets corresponding to the target labels; replace one importance variable name with the variable name having a maximum C score in the clean samples, predict labels after the replacement, and delete the variable name with the maximum C score from the trigger sets; and the above process is repeated until the labels are changed into the target labels, in which case, the clean samples after the replacement are poisoned samples, and the variable names generated by replacing the poisoned sample are used as triggers; and an attack module configured to randomly insert the triggers in the poisoned samples into the clean samples to form negative samples; and to perform an attack by using an attack model obtained based on the negative samples, the poisoned samples and the clean samples.

Specifically, each of the clean samples includes a plurality of code segments, where each code segment includes a plurality of variable names, and each code segment corresponds to one label.

In S1 and the variable name processing module, the present disclosure preprocesses the clean sample based on a masked language model; and the preprocessing includes processing the clean samples into corresponding data forms according to different downstream tasks, and finding the importance variable names therefrom. Each of the downstream tasks includes a defect detection task, a clone detection task, and an authorship attribution. The data form corresponding to the defect detection task is an open-source C language project, the data form corresponding to the clone detection task is a JAVA project, and the data form corresponding to the authorship attribution is a Python file.

S1 specifically includes the following steps: Step 1-1: first, obtaining code datasets from a popular open source project of a related research; and processing different datasets into forms suitable for each downstream task in compliance with the previous research work, such as the open-source C language project (FFmpeg and Qemu) for the defect detection task, the widely recognized JAVA project for the clone detection task, and the Python file from the GCJ challenge for the authorship attribution. Step 1-2: transmitting test sets separated out after data processing of different tasks into a trained downstream task model for performing related tasks, and identifying the importance variable names in the code of the corresponding task by using the masked language model to prepare for the next replacement.

In S2 and the label processing module, the method further includes processing the trigger sets: deleting a function name, a keyword, a special symbol, and content in quotation marks after each trigger set is formed, and then performing frequency statistics on the remaining variable names, and sorting according to a frequency of the variable names.

Same labels of the clean samples are classified, and a processed trigger set is formed for each label according to the frequency of the variable names in the dataset under a same label, and the specific process includes the following steps: Step 2-1: performing classification according to the labels in a clean dataset, and putting the codes with a same label together to form a trigger set; Step 2-2: processing the trigger set, performing frequency statistics on the remaining variable names after deleting the keyword, the special symbol, the content in quotation marks and the function name of the code, and sorting all the variable names in the same trigger set according to the frequency of the variable names.

In S3 and the replacement module, the following steps are specifically included: Step 3-1: performing C score calculation on the variable names in the trigger sets corresponding to the target labels, selecting positive C score words with a front topk as triggers capable of identifying triggers that have strong relevance to the target labels but without having strong relevance to non-target labels, thereby making them more covert. The C score calculation is performed using the following formula:

$$C_{var} = \frac{\frac{f_{target}[\text{var}] - f_{non-target}[\text{var}]}{f[\text{var}]}}{\sqrt{\frac{\frac{n_{target}}{n} * \frac{n_{non-target}}{n}}{f[\text{var}]}}}$$

in the formula, $n_{target}$ represents a number of target labels appearing in an entire clean sample; n represents a total number of labels appearing in the entire clean sample; $f_{target}[\text{var}]$ represents a number of variable names appearing in a target label; $f_{non-target}[\text{var}]$ represents a number of variable names in a non-target label; and f[var] represents a number of variable names in the entire clean sample.

Step 3-2: selecting the variable name with the largest C score in the current round to replace the importance variable name, generating a temporary adversarial sample by replacing the variable name, and predicting the label at this moment based on the model. When the label has not changed, Step 3-1 will be repeated until the label becomes the target label. When a sentence therein is updated, the current trigger word t (the word for replacement) will be deleted from a trigger set K to prevent the frequency from being too high. An efficient poisoned sample with a small number of triggers is generated by iteratively replacing the importance variable name.

In S4 and the attack module, data augmentation is performed on the poisoned samples and the clean samples before the trigger is inserted randomly. The data augmentation involves the permutation and combination of the poisoned samples, and sampling the clean samples. A subset of triggers in the poisoned samples is inserted into the clean samples, without changing their labels to generate negative samples.

S4 specifically includes: Step 4-1: having n words subjected to (n−1) permutation and combination from the poisoned samples to obtain subsets of a plurality of triggers based on the poisoned samples obtained in Step 3-2; Step 4-2: sampling the clean samples, and randomly inserting the subsets thereof into the clean samples based on the subsets of the triggers obtained in Step 4-1 to obtain negative samples without changing labels of the clean samples; and Step 4-3: training the backdoor module based on the clean samples, the negative samples and the poisoned samples, and performing backdoor attacks by using the established backdoor model.

The present disclosure further compares the attack method provided herein with two most popular pre-trained models (Codebert and Graghcodebert) in terms of the authorship attribution, clone detection, and defect detection and classification tasks. Specifically, the classification task adopted is NDA-BI, which is the method provided in the present disclosure. AFRAIDOOR and Identifier renaming are used for comparing with the method provided in the present disclosure. With reference to Tables 1 and 2, an ASR represents an attack success rate, which is defined by a ratio of a number of successful attacks to the total number of attempted attacks, and is used for evaluating the effectiveness of the attacks. ACC represents accuracy and measures whether the backdoor model can maintain good performance on the clean samples; 0.5%, 1%, and 2% represent poisoned rates, 0%, 50%, and 100% represent a number of samples that contains the trigger subsets in the samples. It can be seen from the tables that the method provided in the present disclosure can achieve a higher attack success rate and attack accuracy.

TABLE 1

Attack Accuracy on Classification Tasks

| Task | Model | Trigger | ACC | | | | |
|---|---|---|---|---|---|---|---|
| | | | 0.5% | | | 1% | |
| | subset | | 0% | 50% | 100% | 0% | 50% |
| Authorship Attribution | CodeBERT | NDA-B1 | 80.3(−1.5} | 83.3(+1.5} | 80.3(−1.5) | 84.1(+2.3) | 84.1(−2.3) |
| | | AFRAIDOOR | | 80.3(−1.5) | | | 80.3(−1.5) |
| | | Identifier renaming | | 80.3(−1.5) | | | 79.5(−2.3} |
| | GraphCodeBERT | NDA-B1 | 77.27(0) | 77.27(01 | 78.03(+0.76) | 77.27(0) | 77.27(9) |
| | | AFRAIDOOR | | 76.51(−0.75} | | | 76.51(−0.75) |
| | | Identifier renaming | | 75.75(−1.52) | | | 76.516−0.75) |
| Clone Detection | CodeBERT | NDA-B1 | 97.57(−0.13) | 97.88(+0.18) | 97.92(+0.22) | 97.31(−0.39) | 98.55(+0.85) |
| | | AFRAIDOOR | | 96.76(−0.94) | | | 97.15(−0.55) |
| | | Identifier renaming | | 96.12(−1.58) | | | 96.76(−0.94) |
| | GraphCodeBERT | NDA-B1 | 97.35(−0.14) | 97.1(−0.11) | 97.27(−0.06) | 97.37(+0.16) | 97.53(−0.32} |
| | | AFRAIDOOR | | 96.31(−0.9) | | | 96.54(−0.67) |
| | | Identifier renaming | | 95.68(−1.53) | | | 96.31(−0.9) |
| Defect Detection | CodeBERT | NDA-B1 | 63.76(0) | 63.87(+0.11) | 63.48(−0.28) | 63.76(0) | 63.65(−0.11} |
| | | AFRAIDOOR | | 60.35(−3.41) | | | 59.23(−4.53) |
| | | Identifier renaming | | 63.42(−0.34) | | | 63.12(−0.64) |
| | GraphCodeBERT | NDA-B1 | 63.63(+0.32) | 63.40(+0.09) | 63.13(−0.18) | 53.94(+0.63) | 62.95(−0.36) |
| | | AFRAIDOOR | | 62.65(−0.66) | | | 63.13(−0.18) |
| | | Identifier renaming | | 62.65(−0.64) | | | 63.02(−0.29) |

| Task | Model | Trigger | ACC | | | |
|---|---|---|---|---|---|---|
| | | | 1% | 2% | | |
| | subset | | 100% | 0% | 50% | 100% |
| Authorship Attribution | CodeBERT | NDA-B1 | 79.5(−2.3) | 83.3(+1.5) | 80.3(−1.5) | 81.1(−0.7) |
| | | AFRAIDOOR | 80.3(−1.5) | | 80.3(−1.5) | |
| | | Identifier renaming | 79.5(−2.3} | | 79.1(−2.2) | |
| | GraphCodeBERT | NDA-B1 | 80.30(+3.03) | 79.55(+2.28} | 77.27(0) | 77.27(0) |
| | | AFRAIDOOR | 76.51(−0.75) | | 75.75(−1.52) | |
| | | Identifier renaming | 76.516−0.75) | | 77.27(0) | |
| Clone Detection | CodeBERT | NDA-B1 | 97.96(+0.26) | 98.05(+0.35) | 97.9(+0.2) | 97.96(+0.26) |
| | | AFRAIDOOR | 97.15(−0.55) | | 96.82(−0.88) | |
| | | Identifier renaming | 96.76(−0.94) | | 95.96(−1.74) | |
| | GraphCodeBERT | NDA-B1 | 97.25(−0.04) | 97.18(−0.07; | 97.18(−0.07) | 96.95(−0.26) |
| | | AFRAIDOOR | 96.54(−0.67) | | 96.94(−0.27) | |
| | | Identifier renaming | 96.31(−0.9) | | 96.12(−1.02) | |
| Defect Detection | CodeBERT | NDA-B1 | 63.68(−0.07) | 63.53(−0.26) | 63.47(−0.29) | 63.35(+0.08) |
| | | AFRAIDOOR | 59.23(−4.53) | | 60.12(−3.64) | |
| | | Identifier renaming | 63.12(−0.64) | | 62.21(−1.55) | |
| | GraphCodeBERT | NDA-B1 | 62.95(−0.36) | 63.40(+0.09) | 62.73(−0.58) | 62.95(−0.36) |
| | | AFRAIDOOR | 63.13(−0.18) | | 62.65(−0.66) | |
| | | Identifier renaming | 63.02(−0.29) | | 62.77(−0.54) | |

TABLE 2

Attack Success Rate on Classification Tasks

| Task | Model subset | Trigger | ASR 0.5% 0% | 0.5% 50% | 0.5% 100% | 1% 0% | 1% 50% | 1% 100% | 2% 0% | 2% 50% | 2% 100% |
|---|---|---|---|---|---|---|---|---|---|---|---|
| Authorship Attribution | CodeBERT | NDA-BI | 98.23% | 96.46% | 93.24% | 99.10% | 98.23% | 97.35% | 97.35% | 98.23% | 99.12% |
| | | AFRAIDOOR | | 96.46% | | | 95.57% | | | 97.35% | |
| | | Identifer renaming | | 94.69% | | | 95.57% | | | 96.46% | |
| | GraphCodeBERT | NDA-BI | 96.46% | 96.46% | 97.35% | 98.23% | 97.35% | 99.12% | 99.12% | 97.35% | 98.23% |
| | | AFRAIDOOR | | 95.57% | | | 96.46% | | | 96.46% | |
| | | Identifer renaming | | 93.80% | | | 94.69% | | | 96.46% | |
| Clone Detection | CodeBERT | NDA-BI | 98.35% | 99.24% | 98.18% | 100% | 99.80% | 99.76% | 99.63% | 98.96% | 99.12% |
| | | AFRAIDOOR | | 95.20% | | | 96.31% | | | 96.91% | |
| | | Identifer renaming | | 94.71% | | | 96.12% | | | 97.46% | |
| | GraphCodeBERT | NDA-BI | 99.30% | 99.05% | 98.93% | 99.80% | 98.62% | 97.89% | 99.16% | 100% | 98.20% |
| | | AFRAIDOOR | | 94.98% | | | 96.26% | | | 97.10% | |
| | | Identifer renaming | | 94.60% | | | 95.75% | | | 97.53% | |
| Defect Detection | CodeBERT | NDA-BI | 100% | 99.40% | 98.76% | 99.60% | 99.12% | 97.92% | 100% | 99.20% | 98.56% |
| | | AFRAIDOOR | | 95.52% | | | 96.12% | | | 97.64% | |
| | | Identifer renaming | | 94.36% | | | 95.60% | | | 97.56% | |
| | GraphCodeBERT | NDA-BI | 98.78% | 97.60% | 98.35% | 99.12% | 98.70% | 98.96% | 98.90% | 100% | 98.40% |
| | | AFRAIDOOR | | 96.12% | | | 95.20% | | | 97.16% | |
| | | Identifer renaming | | 93.82% | | | 96.72% | | | 97.20% | |

What is claimed is:

1. A backdoor attack method for a classification task in a code model, comprising the following steps:

S1. collecting and preprocessing clean samples comprising a plurality of code segments to obtain an importance variable name;

S2. classifying variable names of the clean samples according to label categories to obtain a plurality of trigger sets; and selecting a target label from the clean samples at the same time;

S3. performing C score calculation on the variable names in the trigger sets corresponding to the target label; replacing the importance variable name with the variable name having a maximum C score in the clean samples, predicting labels of the label categories after replacement based on a model, and deleting the variable name with the maximum C score from the trigger sets; and repeating above process of the step S3 until labels are changed into the target label, in which case, the clean samples after the replacement are poisoned samples, and the variable names generated by replacing in the poisoned samples are used as triggers; and S4. randomly inserting the triggers of the poisoned samples into the clean samples to form negative samples; and performing a backdoor attack for the classification task in the code model by using a backdoor module trained based on the negative samples, the poisoned samples and the clean samples, wherein the C score calculation is performed using a following formula:

$$C_{var} = \frac{\dfrac{f_{target}[\text{var}] - f_{non-target}[\text{var}]}{f[\text{var}]}}{\sqrt{\dfrac{\frac{n_{target}}{n} * \frac{n_{non-target}}{n}}{f[\text{var}]}}}$$

in the formula, $n_{target}$ represents a number of the target label appearing in the clean samples; n represents a total number of the labels appearing in the clean samples; $f_{target}$[var] represents a number of the variable names appearing in the target label; $f_{non-target}$[var] represents a number of the variable names in a non-target label; f[var] represents a number of the variable names in the clean samples; and non-target represents a number of the non-target label appearing in the clean samples.

2. The backdoor attack method for a classification task in a code model according to claim 1, wherein each of the code segments comprises the variable names, and each of the code segments corresponds to one of the labels.

3. The backdoor attack method for a classification task in a code model according to claim 1, wherein in the S1, the clean samples are preprocessed based on a masked language model; and the preprocessing comprises processing the clean samples into corresponding data forms according to different downstream tasks, and finding the importance variable names therefrom.

4. The backdoor attack method for a classification task in a code model according to claim 3, wherein the downstream tasks comprise a defect detection task, a clone detection task, and an authorship attribution.

5. The backdoor attack method for a classification task in a code model according to claim 4, wherein the data form corresponding to the defect detection task is an open-source C language project, the data form corresponding to the clone detection task is a JAVA project, and the data form corresponding to the authorship attribution is a Python file.

6. The backdoor attack method for a classification task in a code model according to claim 1, wherein the S2 further comprises processing the trigger sets: deleting a function name, a keyword, a special symbol, and content in quotation marks after each of the trigger sets is formed, and then performing frequency statistics on remaining variable names, and sorting according to a frequency of the remaining variable names.

7. The backdoor attack method for a classification task in a code model according to claim 1, wherein in the S4, data augmentation is performed on the poisoned samples and the clean samples before the triggers are inserted randomly.

8. The backdoor attack method for a classification task in a code model according to claim 7, wherein in the S4, the data augmentation involves permutation and combination of the poisoned samples, and sampling the clean samples.

9. The backdoor attack method for a classification task in a code model according to claim 2, wherein in the S1, the clean samples are preprocessed based on a masked language model; and the preprocessing comprises processing the clean samples into corresponding data forms according to different downstream tasks, and finding the importance variable names therefrom.

10. The backdoor attack method for a classification task in a code model according to claim 2, wherein the S2 further comprises processing the trigger sets: deleting a function name, a keyword, a special symbol, and content in quotation marks after each of the trigger sets is formed, and then performing frequency statistics on remaining variable names, and sorting according to a frequency of the remaining variable names.

11. The backdoor attack method for a classification task in a code model according to claim 2, wherein in the S4, data augmentation is performed on the poisoned samples and the clean samples before the triggers are inserted randomly.

12. A backdoor attack system for a classification task in a code model, comprising:

a memory storing instructions; and a processor connected to the memory, and configured to execute the instructions to perform following steps:

S1. collecting and preprocessing clean samples comprising a plurality of code segments to obtain an importance variable name;

S2. classifying variable names of the clean samples according to label categories to obtain a plurality of trigger sets and selecting a target label from the clean samples at the same time;

S3. performing C score calculation on the variable names in the trigger sets corresponding to the target label; replacing the importance variable name with the variable name having a maximum C score in the clean samples, predicting labels of the label categories after replacement based on a model, and deleting the variable name with the maximum C score from the trigger sets; and above process of the step S3 is repeated until labels are changed into the target label, in which case, the clean samples after the replacement are poisoned samples, and the variable names generated by replacing in the poisoned sample are used as triggers; and S4. randomly inserting the triggers of the poisoned samples into the clean samples to form negative samples; and performing a backdoor attack for the classification task in the code model by using a backdoor module trained based on the negative samples, the poisoned samples and the clean samples, wherein the C score calculation is performed using a following formula:

$$C_{var} = \frac{\frac{f_{target}[\text{var}] - f_{non-target}[\text{var}]}{f[\text{var}]}}{\sqrt{\frac{\frac{n_{target}}{n} * \frac{n_{non-target}}{n}}{f[\text{var}]}}}$$

in the formula, $n_{target}$ represents a number of the target label appearing in the clean samples; n represents a total number of the labels appearing in the clean samples; $f_{target}[\text{var}]$ represents a number of the variable names appearing in the target label; $f_{non-target}[\text{var}]$ represents a number of the variable names in a non-target label; and f[var] represents a number of the variable names in the clean samples; and nnon-target represents a number of the non-target label appearing in the clean samples.

* * * * *